(12) United States Patent
King

(10) Patent No.: US 9,979,824 B2
(45) Date of Patent: May 22, 2018

(54) CALLBACK SYSTEM

(75) Inventor: Matthew King, Greater London (GB)

(73) Assignee: ORDERLY MIND LIMITED, London (GB)

( * ) Notice: Subject to any disclaimer, the term of this patent is extended or adjusted under 35 U.S.C. 154(b) by 0 days. days.

(21) Appl. No.: 14/233,467

(22) PCT Filed: Jul. 20, 2012

(86) PCT No.: PCT/GB2012/051742
§ 371 (c)(1),
(2), (4) Date: Apr. 24, 2014

(87) PCT Pub. No.: WO2013/014426
PCT Pub. Date: Jan. 31, 2013

(65) Prior Publication Data
US 2014/0226809 A1  Aug. 14, 2014

(30) Foreign Application Priority Data

Jul. 22, 2011 (GB) .................. 1112585.3

(51) Int. Cl.
*H04M 3/523* (2006.01)
*H04M 3/42* (2006.01)

(52) U.S. Cl.
CPC ....... *H04M 3/5231* (2013.01); *H04M 3/5232* (2013.01); *H04M 3/5238* (2013.01); *H04M 3/42382* (2013.01)

(58) Field of Classification Search
CPC .. H04M 3/5231; H04M 3/523; H04M 3/5183; H04M 3/42323; H04M 3/42059; H04M 3/42314

(Continued)

(56) References Cited

U.S. PATENT DOCUMENTS 5,946,388 A * 8/1999 Walker et al. ........... 379/266.01
6,130,933 A * 10/2000 Miloslaysky .............. 379/90.01
(Continued)

FOREIGN PATENT DOCUMENTS

GB  2403621 A  1/2005
GB  2477558 A  8/2011

OTHER PUBLICATIONS

Patents Act 1977: "Combined Search and Examination Report and Response under Sections 17 and 18(3)", dated Jul. 22, 2013, for GB Application No. 1112585.3, 22pgs.

(Continued)

*Primary Examiner* — Ahmad F Matar
*Assistant Examiner* — Jirapon Intavong
(74) *Attorney, Agent, or Firm* — Buckley, Maschoff & Talwalkar LLC

(57) ABSTRACT

A method mediated by a Service for automatically connecting callers to agents at a call center environment using a communication network. The method comprises receiving at the Service a first call from a Caller to a Destination and placing a call from the Service to the Destination. The method further comprises determining that an Agent at the Destination has answered or is about to answer the placed call, notifying the Caller that an Agent has answered or is about to answer the placed call, receiving at the Service a second call from the Caller, and connecting the Caller to the Agent. The method may advantageously be used in combination with an App for a smartphone. A system is adapted to perform the method for automatic connection.

28 Claims, 7 Drawing Sheets

(58) Field of Classification Search
USPC .................................... 379/265.11, 265.02
See application file for complete search history.

(56) References Cited

U.S. PATENT DOCUMENTS

| | | | |
|---|---|---|---|
| 6,141,328 A | 10/2000 | Nabkel et al. | |
| 6,665,396 B1 | 12/2003 | Khouri et al. | |
| 6,700,972 B1* | 3/2004 | McHugh et al. | 379/265.13 |
| 6,975,720 B1* | 12/2005 | Crook | 379/266.01 |
| 8,472,612 B1* | 6/2013 | Goringe | H04M 3/42187 |
| | | | 379/265.01 |
| 2002/0076030 A1* | 6/2002 | Statham | H04M 3/22 |
| | | | 379/229 |
| 2007/0071223 A1* | 3/2007 | Lee et al. | 379/265.02 |
| 2009/0060162 A1* | 3/2009 | Lachhiramka | 379/214.01 |
| 2009/0086957 A1* | 4/2009 | Kelley et al. | 379/265.09 |

OTHER PUBLICATIONS

Patents Act 1977: "Examination Report under Sections 17 and 18(3)", dated Feb. 10, 2014, for GB Application No. 1112585.3, 5pgs.

"PCT Notification of the International Search Report and the Written Opinion of the International Searching Authority", dated Nov. 15, 2012 (dated Nov. 15, 2012), for International Application No. PCT/GB2012/051742, 12pgs.

\* cited by examiner

CALLBACK SYSTEM

CROSS-REFERENCE TO RELATED APPLICATIONS

This application is a U.S. National Stage filing under 35 U.S.C. § 371 and 35 U.S.C § 119, based on and claiming benefit of and priority to PCT/GB2012/051742 filed 20 Jul. 2012 and GB Application No. 1112585.3 filed 22 Jul. 2011 for "A CALLBACK SYSTEM" all of which are incorporated herein by reference.

FIELD OF THE INVENTION

The invention relates to the provision of call centre services to callers. In particular, it provides a means for callers to wait offline when enqueued with the call centre and to be notified to reconnect when a call centre agent is available.

BACKGROUND TO THE INVENTION

When queues build up at a busy call centre (by which is meant any group of people whose primary activity is answering or making calls), callers will often hang up leading to abandoned calls. These abandoned calls are bad for both the call centre (who lose the opportunity to do business with the caller) and for the caller (who cannot get through to the call centre).

Traditional approaches to solving this problem include taking a message automatically or through a receptionist, or looking at abandoned call logs and manually calling back callers when agents are free. These approaches have several major draw-backs:
  The manual process requires management and is complex for agents
  Agents may not be able to answer new incoming calls while making call-backs
  The caller does not know when, or even if, to expect a call-back
  The caller may therefore still be trying to get through while call-backs are attempted More recently, a number of automated approaches to this problem have been proposed, as we shall now discuss.
Automatic Agent-Callback Agent-Callback systems initiate a call back from the call centre to the caller at a later time. Typically, the caller must first request a call back (at which point he/she leaves the queue and will not be answered on that call) by leaving a name and telephone number. Then the system finds an agent. Typically, the agent must acknowledge the call before the call-back to the caller is launched. If the caller is then unavailable, the agent must waste time leaving a message and scheduling another callback.

Most Agent-Callback systems are unaware of the conditions at the relevant call centre at the time the attempt to find the agent is made. Therefore, they often make callbacks during busy periods and must be 'throttled' to prevent the call centre from becoming entirely outbound.

Some Agent-Callback systems allow the caller to schedule a time for the callback, in which case the call centre manager must ensure an agent is free to make the callback at that time. Even Agent-Callback systems that are aware of current queue status, and only launch callbacks when the inbound queue is empty, still tie up agents from answering new inbound calls.

Furthermore, the Call Centre manager must decide on a minute-to-minute basis whether to offer the call-back option, since if the system is left enabled when long queues form, then it is easy to promise more call-backs than the call centre can deliver ('call-back debt').

In all Agent-Callback scenarios, there is a charge for calling back the caller for the portion of the call in which the agent is connected to the caller. This cost must be borne by the callback service operator and is passed on to the Call Center. This in effect means that callers can only benefit from such systems when the destination call centres have chosen to install one.

As will be appreciated, there is a need for an improved system which addresses these problems.
Manual Caller-Callback There is one system in existence, the "OrderlyQ" system described in WO2005/112389, which focuses on an approach whereby the caller calls back in, rather than the call centre calling back the original caller. This avoids many of the problems and much of the expense associated with Agent-Callback systems.

In this scenario, the caller calls in and is given an estimated wait time. If the wait time is more than a minute, for example, the caller is encouraged to hang up and call back after that time. When the caller calls in the second time, the Caller-Callback system restores the caller to the front of the queue for immediate service by the next available agent. However, the OrderlyQ system does not attempt to find an agent to answer the caller unless the caller is on the line at that time.

While extremely effective at reducing abandonment, this system also has limitations. In order to restore returning callers to the front of the queue, all calls to the destination team must be routed through the system. Otherwise, in the alternative situation, callers returning through the Caller-Callback system will be competing with direct callers, who may have been on hold for longer on that particular call, but who should not be ahead of the returning caller. The automatic provision of accurate estimated waits also requires all inbound calls to be routed through the system. In addition, the costs of delivering all these calls are borne by the Service Provider and passed on to the Call Centre.

Furthermore, it is unfeasible for agents to manually acknowledge every call before connection to the caller. Therefore, the Call Centre must supply a number to the Caller-Callback system operator that just rings until an agent answers, so that the system can detect when this has happened. This means that the Call Centre must make modifications to their existing system in order to run the Caller-Callback system. It also means that callers can only take advantage of current Caller-Callback systems if the destination call centre has chosen to install it.

OrderlyQ is a manual system, in that it gives the caller an estimated wait and then encourages the caller to call back after that time. When the caller calls back, he/she is expected to be at the front of the queue. However, there is no guarantee that an agent will be available to take the call at that moment, and so the caller may still be waiting in the queue for an agent to become available. Again, an improved system is required for handling call back in call centre type environments.

SUMMARY OF THE INVENTION

According to a first aspect of the present invention, there is provided a method mediated by a Service for automatically connecting callers to agents at a call centre environment using a communication network, the method comprising the steps of:

receiving at the Service a first call from a Caller to a Destination;
    placing a call from the Service to the Destination;
    determining that an Agent at the Destination has answered or is about to answer the placed call;
    notifying the Caller that an Agent has answered or is about to answer the placed call;
    receiving at the Service a second call from the Caller; and, connecting the Caller to the Agent.

In the present invention a call from a caller to a destination is received at the system (the Service) and the number from which the caller is calling is determined. The system initiates a telephone call to the destination through the telephone network and waits for the destination to accept the call. The caller side of the call ends, so the caller does not wait on hold for the agent to answer. Upon agent answer, the caller is notified that the agent is on the line, and advised to call in to the system immediately. When the caller calls the system, the agent and caller are connected.

In some embodiments the Caller may be requested to enter a number for the Destination. For example, the Destination number may determined from a manual entry by the Caller using the keypad on a phone. Alternatively, the Destination number may be determined from the CallerID of the incoming call. When the Caller has a smart phone, the Destination number may be determined by an App running on the smart phone.

A number for the Caller may be determined, for example by CallerID or from a manual entry of the Caller number by the Caller. The first call from the Caller may be placed directly from a phone of the Caller. Alternatively, the first call to the Service from the Caller may have been forwarded from another source.

In some embodiments the call placed by the Service to the Destination is associated with the number of the Caller. Preferably, this association is persistently stored, in which case the step of connecting the Caller to the Agent may comprise the steps of determining the number of the returning Caller, retrieving the association between the number of the returning Caller and the call to the Destination, and connecting the returning call with the associated call to the Destination.

In some implementations, the Caller may be disconnected from the Service once the Destination number has been obtained, and the call from the Service to the Destination may be placed at a later time. The rate of calls placed from the Service to the Destination may be controlled or throttled.

The determination as to whether an Agent at the Destination has answered the call may performed by determining that the call placed to the Destination is no longer ringing. Alternatively, it may comprise receiving, at the Service, an indication entered by the Agent using the numeric keypad of the Agent's phone.

The determination as to whether an Agent at the Destination is about to answer the call may comprise receiving information from the Destination PBX. Alternatively it may be made using historical queue time data at the Service.

In some embodiments the Service itself may be integrated with or provided as part of the Destination PBX.

The Caller may be notified that an Agent has answered (or is about to answer) the call by any one of several forms of notification, including sending an SMS message to the Caller, causing a phone of the Caller to ring for a short time, playing a short message on answer, or sending a message to an App on a smart phone of the Caller. In the latter example, the subsequent call from the Caller's smart phone to the Service may be initiated automatically.

In some embodiments, placing the call from the Service to the Destination may comprise placing the call to the Destination such that the Caller can hear the call on a telephone, allowing the Caller to make menu choices using the telephone, allowing the Caller to disconnect the telephone from the call by using at least one of a smart phone App and a predefined key sequence, and leaving the call to the Destination in place after the Caller has disconnected.

When the Caller is using a smart phone, the method may comprise the steps of:

providing the Caller with an App for a smart-phone;
    using, by the caller, the App to enter or select the number for the Destination;
    sending, by the App, the Destination number and the associated Caller's number to the Service;
    storing, by the Service, the association of Destination and Caller number persistently as an impending request;
    originating, by the App, a call from the Caller's smart phone to the service;
    using, by the Service, the stored impending request to determine the number of the Destination; and,
    placing a call from the Service to the Destination.

According to a second aspect of the present invention, there is provided a system adapted to perform the method steps according to the first aspect. The system may hosted be a third party or may be partially or wholly integrated with other parts of the communication network, such as at the Destination PBX.

As will be appreciated, in the present invention, callers are connected to a busy call centre without having to wait on hold or having the agent call back the caller. The invention provides for all the advantages of Agent-Callback and Caller-Callback systems, without the necessity for calling back callers, and without the necessity of routing all calls through the system.

Compared to known Agent-Callback systems, the present system does not call back the caller for the conversation with the agent. Rather, the Service notifies the caller that an agent is on the line and to call back in to the system for connection. One benefit over known systems is that the call centre and service operator then do not have the expense of calling back the caller for the connected portion of the call, typically of 3 minutes duration (average, source DTI). This may be prohibitively expensive, particularly when the caller is using a mobile phone. Furthermore, as the onus is on the Caller to make a call in to the system, the agent does not waste time leaving voicemails or rescheduling further callbacks.

Compared to the known OrderlyQ system, rather than give an estimated wait, the system of the present invention does try to find an agent for the caller while the caller waits off hold. When the system finds the agent, the caller is notified that the agent is waiting, and encouraged to call back in immediately. The caller is then connected straight away, rather than having to wait for an agent to become available.

A benefit of the present invention to the caller is knowing that he/she will get served straight away when he/she makes the second call into the system, and does not have to remember to call back in later. A benefit of the invention to the call centre is that the callers are notified when it is time to call in, so the call centre does not rely on callers remembering to call back in later. A benefit to all parties is that the system of the present invention does not require all calls to be routed through it, so that the system can be used in an ad-hoc manner by just some of the callers. This substantially reduces costs.

The system can therefore be used by a Caller to reach any destination call centre, without the need for the destination call centre to have installed or bought the system. Thus, callers who are trying to reach an understaffed call centre, where the management do not have sufficient resource to improve answer rate through staffing or technology, can still use the system to get through.

Unlike the known systems described previously, which must be sold by the Service Provider to the Destination (i.e. business-to-business), the system of the present invention can be delivered as a business-to-consumer product directly from the Service Provider to the Callers, paid for through the use of non-geographic number charges, as an easy way to get through to any busy call centre. The present invention is unique in this regard.

As will be appreciated by those skilled in the art, the present invention provides an elegant solution to many of the problems and drawbacks associated with known systems for handling calls to a call centre environment. The invention provides particularly useful functionality when combined with an "App" running on the Caller's smartphone

BRIEF DESCRIPTION OF THE DRAWINGS

Examples of the present invention will now be described in detail with reference to the accompanying drawings, in which.

DETAILED DESCRIPTION

Figure 1:
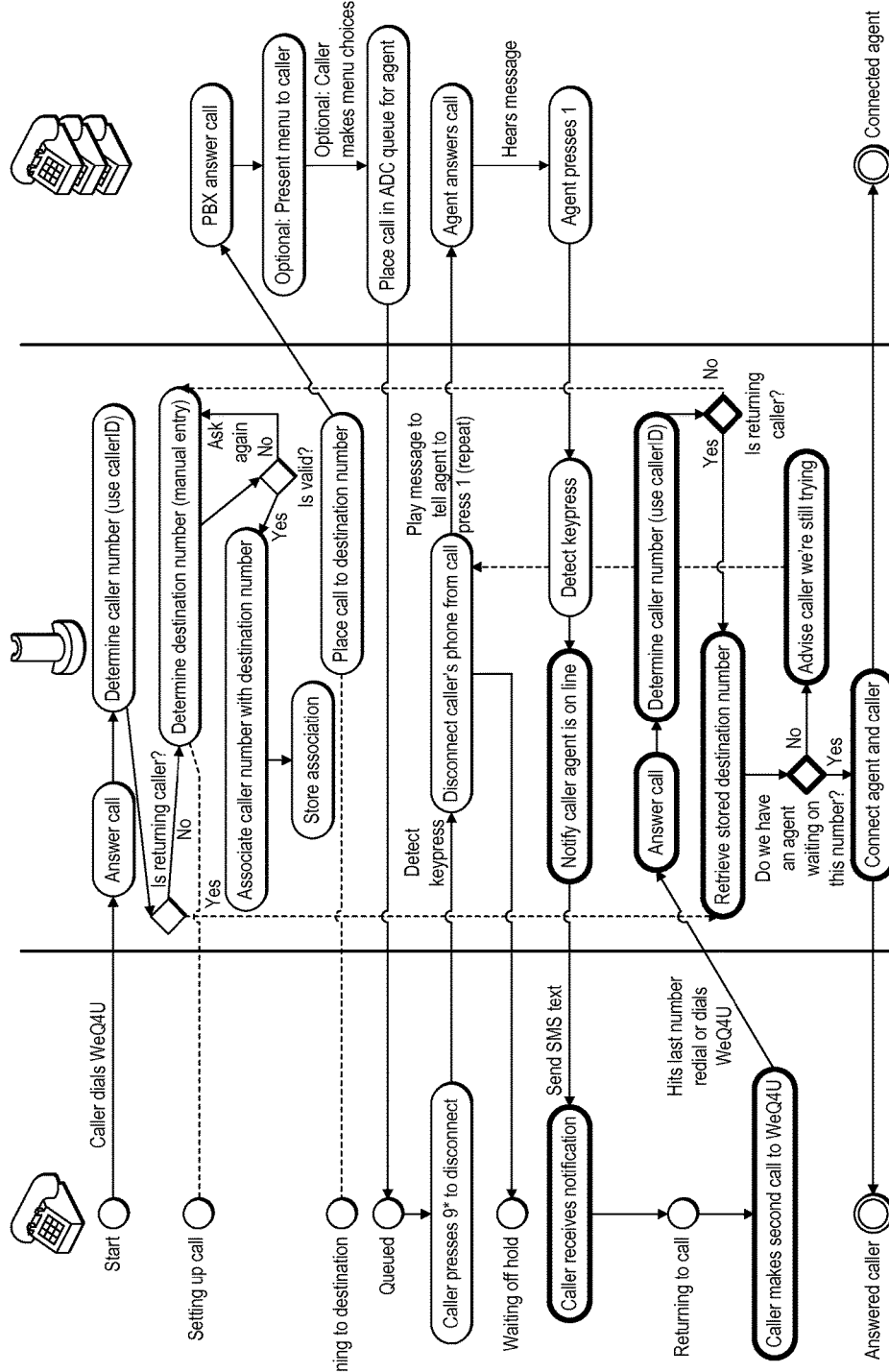
FIG. 1 illustrates schematically the operation of the business-to-consumer embodiment of the invention.

The present invention finds application in a number of scenarios and we now consider some of these with reference to the drawings, namely a business-to consumer ("phone only") embodiment, a smart phone ("App") embodiment, and a business-to-business ("call centre") embodiment. Although these three embodiments have some differences, the key innovative step of notifying the caller to call back in once an agent has been (or is about to be) found is the same in all three embodiments. These steps are highlighted in the accompanying figures.

Business-to-Consumer Embodiment

As shown schematically in FIG. 1, the process for a typical usage is as follows:

1) The caller calls the Service Provider's non-geographic business-to-consumer number.
2) The caller's CallerID (=phone number) is automatically detected and stored.
3) The caller enters the number of the call centre he/she wishes to reach.
4) A call is placed into the call centre. The caller hears ringing, and any messages played by the call centre's automated system.
5) If the caller is presented with a menu, the caller uses his/her telephone keypad to make menu choices as normal.
6) Once the caller is in a queue, the caller presses 9* on his/her telephone keypad to disconnect his/her telephone from the call.
7) The call to the call centre remains in place. When the agent answers, he/she acknowledges the call with a keypress, and waits for the caller to return.
8) The caller is notified by the system that an agent has answered the call, and asked to call into the Service Provider's number straight away.
9) When the caller returns to the Service Provider's number, the caller's CallerID is recognised, and the agent and caller are connected.

The step of notifying the caller that the agent has answered may take place in several ways. We may:
  a) Send an SMS text to the caller's phone.
  b) Cause the caller's phone to ring for a short time (e.g. twice).
  c) Call the caller's phone and play a short message advising the caller to hang up and call back in now (note: the caller is not connected to the agent with this call, which is of very short duration and consequently inexpensive).

Smart-Phone (App) Embodiment

The above steps work with any phone and any destination call centre. When combined with a smartphone (that is, a phone with an internet connection and programmable applications), the process can be streamlined for the user, as shown schematically in FIG. 2. FIGS. 3A, 3B, 3C and 3D show screenshots from the associated application ('App') running on the smartphone. The steps in this embodiment are as follows:

1) The caller opens the App on the smartphone and enters the number of the destination call centre he/she wishes to reach.
2) The app uses the smart phone's internet connection to notify the service provider of an impending request from the caller's number to the desired destination number.
3) The app initiates a phone call from the caller's smart phone to the Service Provider's non-geographic number.
4) The Service recognises the call by the CallerID and launches the call to the destination call centre automatically, without the caller having to re-enter the destination number.
5) The call proceeds as through steps 4-7 of the "phone only" embodiment above.
6) When an agent has acknowledged the call, the step of notifying the caller consists of the Service sending a message to the app on the smart phone using the smart phone's internet connection to indicate that an agent has been found.
7) The app causes the smart phone to beep loudly (fanfare) and automatically launches a call into the Service Provider's number from the phone.
8) The Caller and Agent are connected as in step 9 of the "phone only" embodiment above.

By using a smart phone App, the caller is saved the trouble of dialing two separate numbers, as he/she no longer has to enter the Service Provider's number to start the process.

The caller also does not have to take separate action to be connected when the agent answers the phone, as the second call from the caller is launched automatically by the system. This will also mean that agents answering calls from the App embodiment will be connected to callers more quickly.

Business-to-Business Embodiment

Figure 4:
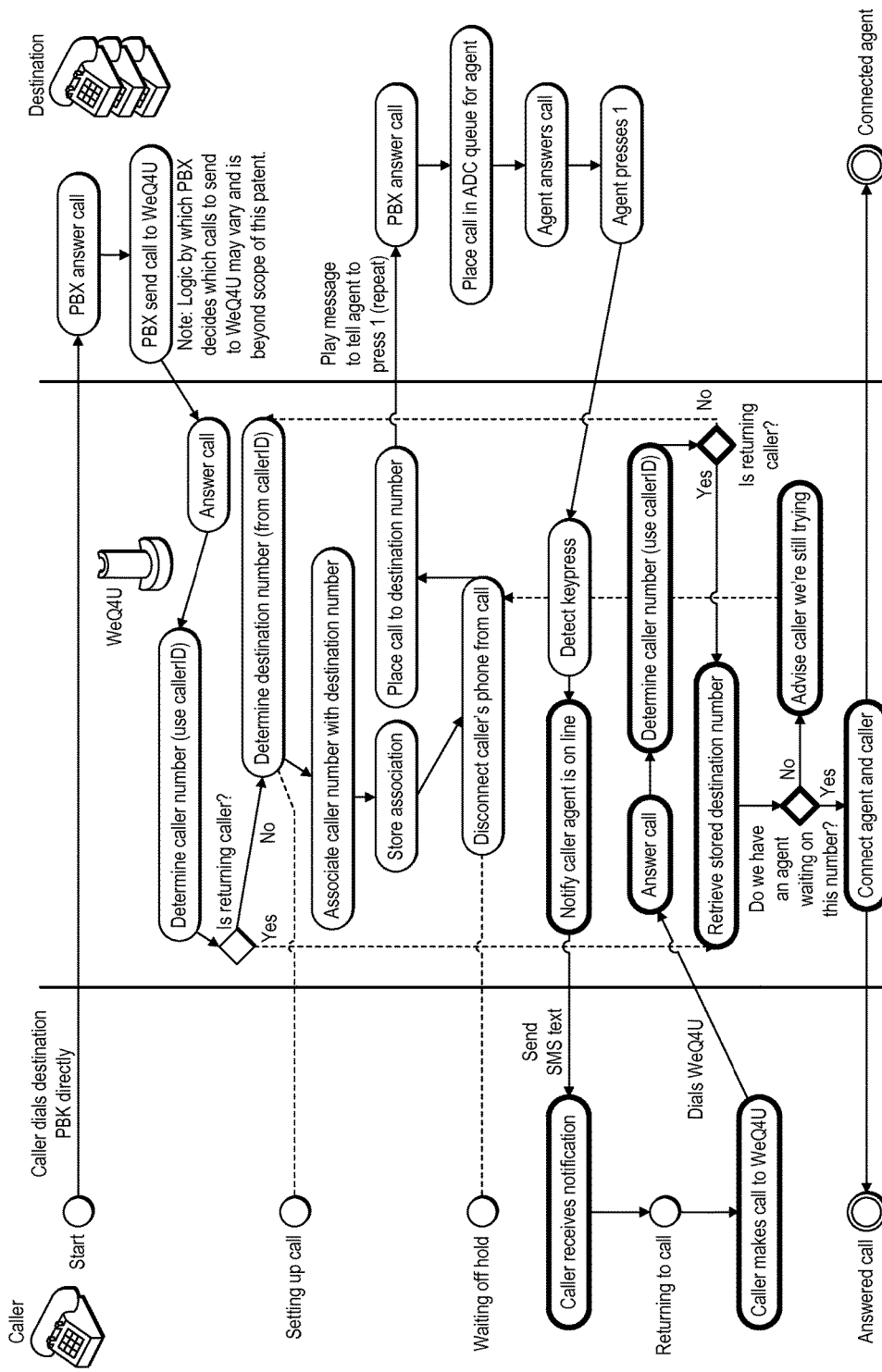

The system of the present invention can also be used on a business-to-business basis by having the Destination send some (or all) calls to the Service when things are busy, as illustrated schematically in FIG. 4. In this embodiment the steps are as follows:

1) The caller calls directly into the Destination.
2) If there is a queue, the PBX at the Destination gives the option to the caller to queue off hold, by pressing 1 on the caller's keypad, for instance.
3) The Destination sends the call to a particular business-to-business number at the Service by placing an outbound call to the Service with the caller connected to it. Typically the outbound call will have the CallerID of the Destination, rather than the original Caller, so the system uses that to determine the Destination number automatically. Alternatively, the number of the Destination may be pre-arranged (by association with a particular business-to-business number).
4) The Service asks the Caller to enter a number where they can be reached. The association between the caller's number and the destination number is stored.
5) The Service places a call into the Destination on the caller's behalf as before.
6) When the Destination acknowledges the call (i.e. an agent is found), the Service notifies the Caller to call back in to the Service (not the Destination).
7) The Caller and Agent are connected.

Figure 2:
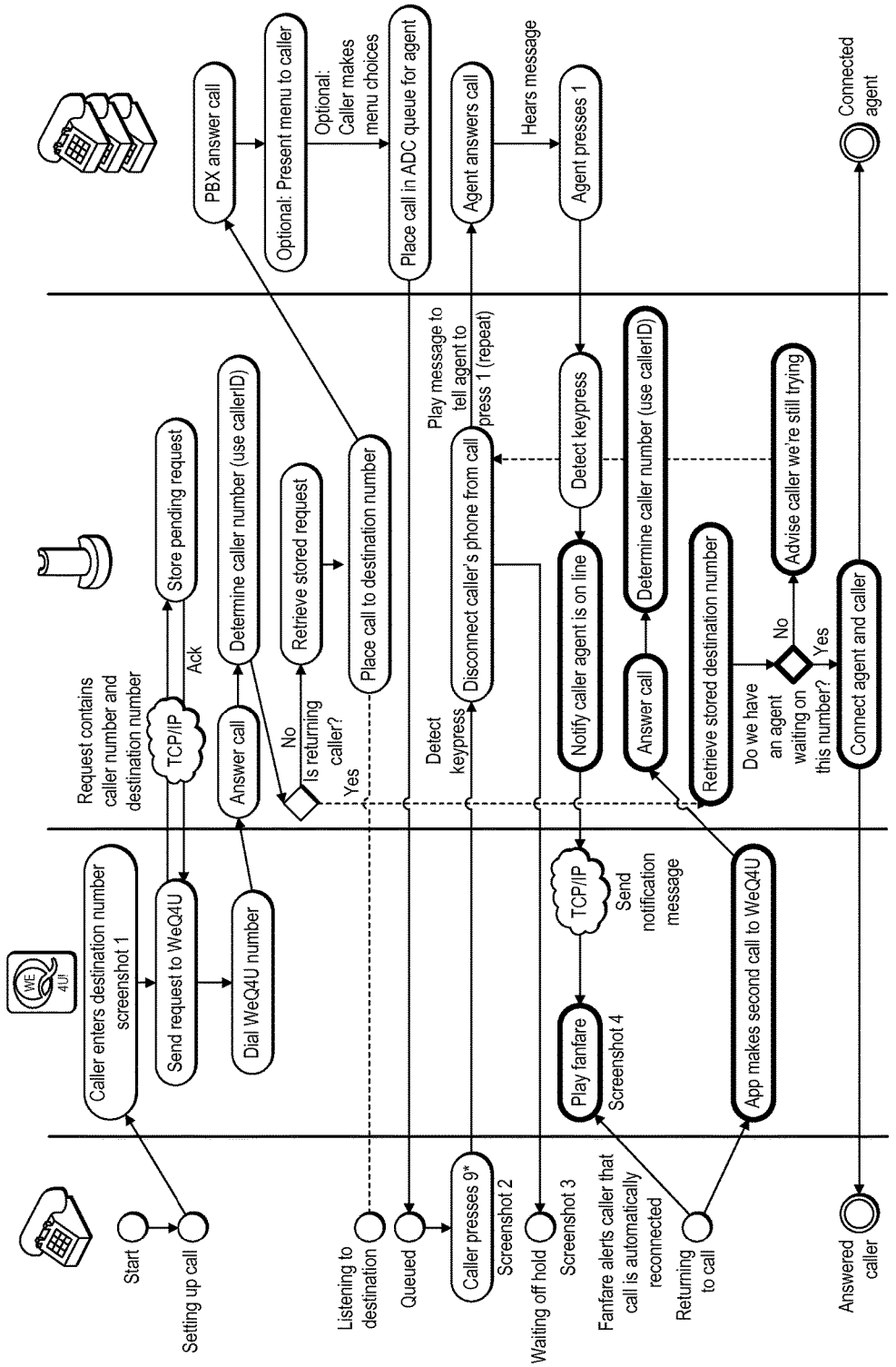
FIG. 2 illustrates schematically the operation of the smartphone embodiment of the invention.
Figure 3A:
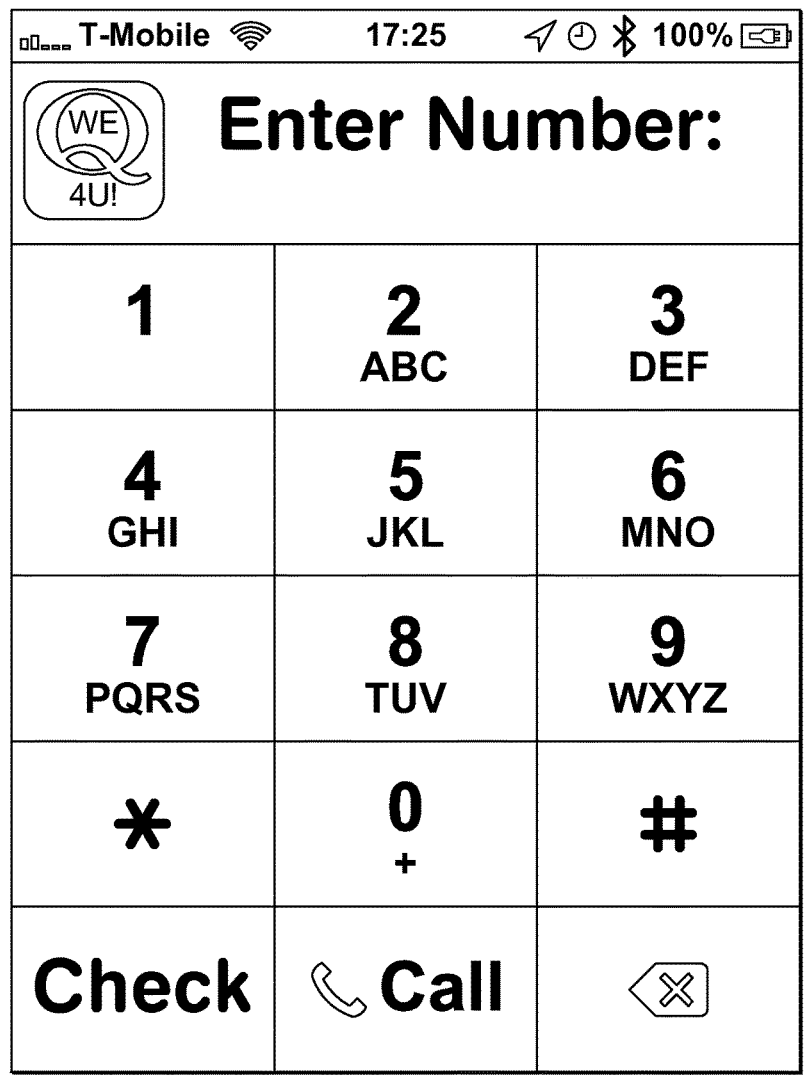
FIGS. 3A, 3B, 3C and 3D show screenshots of the "App" in the smartphone embodiment of FIG. 2; and, FIG. 4 illustrates schematically the operation of the business-to-business embodiment of the invention.
Figure 3B:
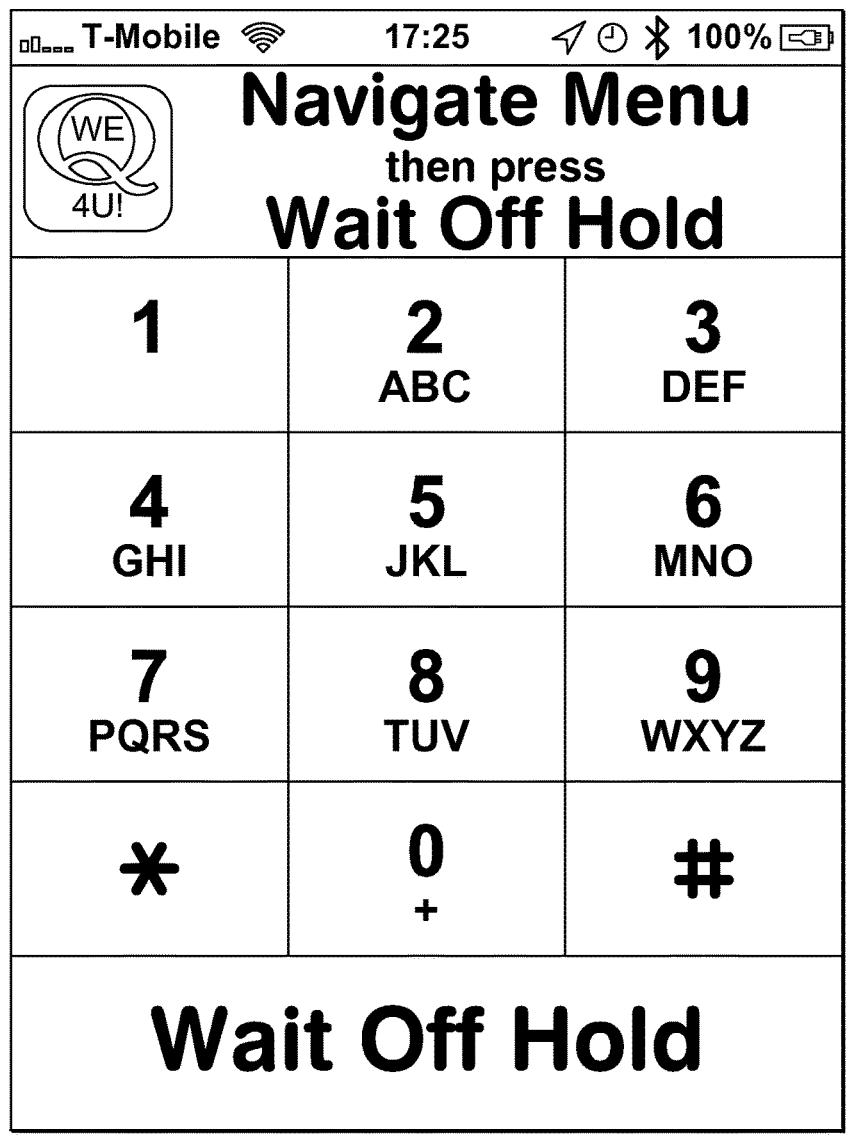
Figure 3C:
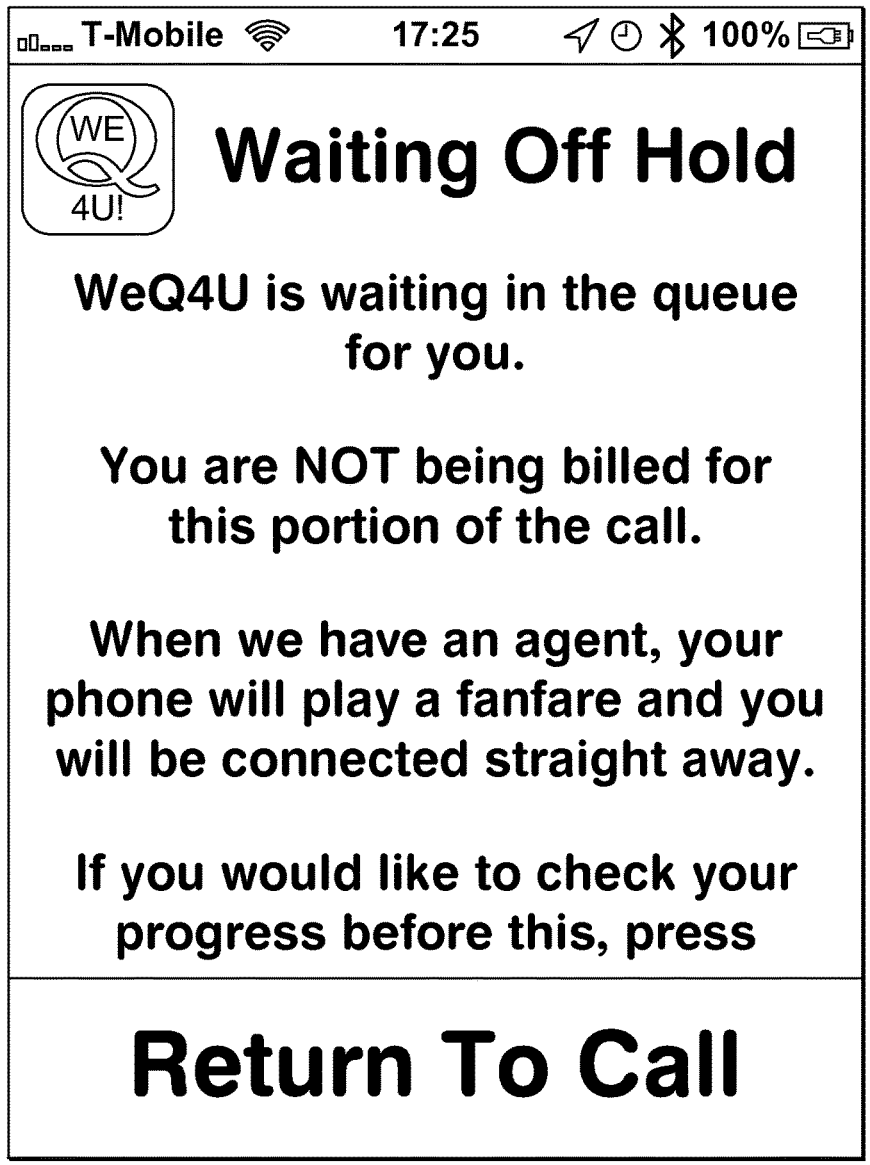
Figure 3D:
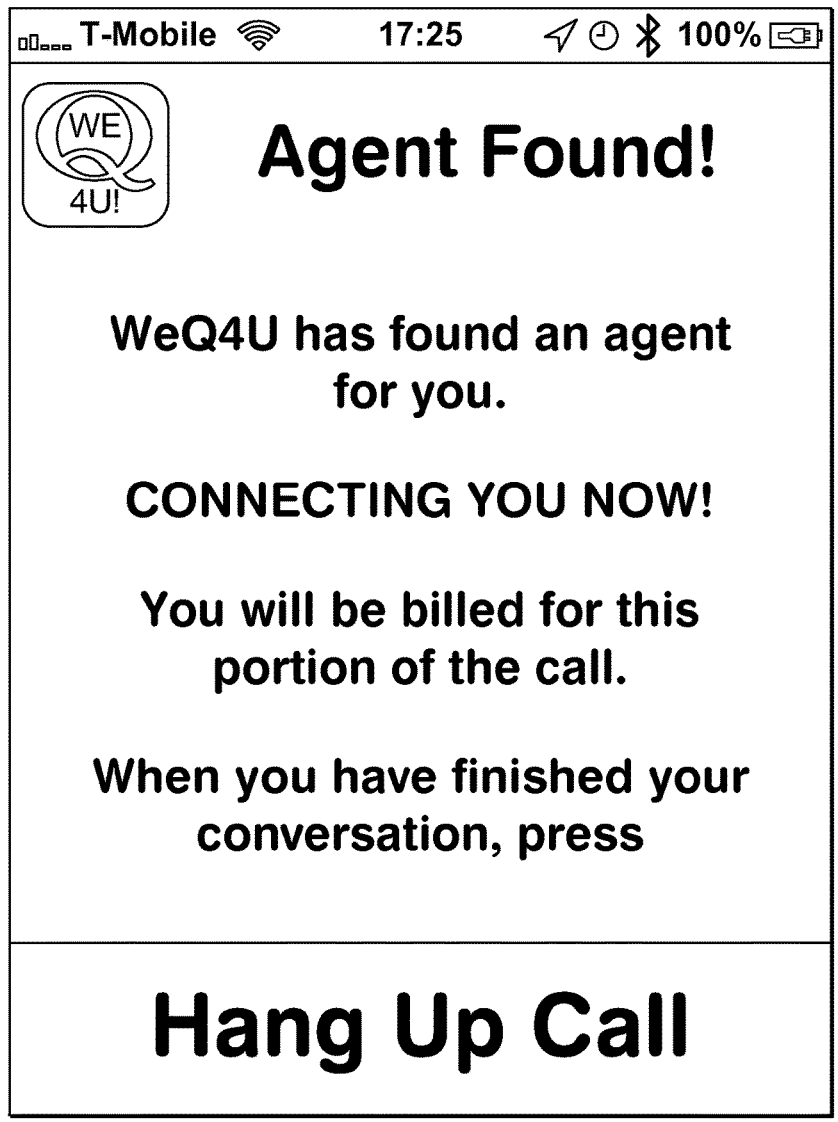

This process shown schematically in FIG. 4 is slightly different than that shown in FIGS. 1 and 2 in that the caller does not remain on hold to select menu options after the Caller Number and Destination Number have been identified, rather the call to the destination is launched afterwards.

This has the advantage of the caller not having to navigate a call centre menu twice. Also, it is envisaged that the Service Provider is supplied with a direct number to the team at the Destination to facilitate this. Further, this means that the service can be throttled by the call centre manager to prevent too many calls being launched at once.

At larger call centres it may also be desirable to notify the caller to call back in a short time before an agent has become available, where such a determination can be made. This information could be extracted directly from the Destination PBX, or from information on current wait times from the WeQ4U system.

Failure Conditions

There is a risk that agents at the call centre may hang up the call rather than acknowledge it. There is also a risk that the agent may hang up after acknowledgement, but before the caller has called back from his/her phone into the system for connection. In these cases, the system may notify the caller that the destination call centre has hung up by performing one or more of the following:

a) Calling the caller and playing a short message.
b) Sending an SMS text.
c) Sending a message over the internet to the app on the caller's smart phone (app embodiment only).

In this way the caller is notified of an apparent failure in the intended connection to the agent.

Other embellishments and modifications to the invention will become apparent to the skilled person in light of this disclosure.

The invention claimed is:

1. A method mediated by a Service for automatically connecting callers to agents at a call center environment using a communication network, the method comprising the steps of:

receiving at the Service a first call from a Caller to a Destination;
placing a call from the Service to the Destination;
maintaining the placed call to the Destination while disconnecting the Caller from the first call;
subsequently, after disconnecting the Caller from the first call, determining that an Agent at the Destination has answered the placed call to the Destination;
notifying the Caller that an Agent has answered the placed call to the Destination, wherein the notification does not connect the Caller with the Agent;
subsequently, after notifying the Caller that the Agent has answered the placed call to the Destination, receiving at the Service a second call from the Caller; and,
connecting the Caller to the Agent by connecting the second call to the placed call to the Destination.

2. The method according to claim 1, further comprising the step of determining a number for the Caller.

3. The method according to claim 2, wherein the number for the Caller is determined by CallerID.

4. The method according to claim 2, wherein the number for the Caller is determined from a manual entry of the Caller number by the Caller.

5. The method according to claim 2, wherein the call placed by the Service to the Destination is associated with the number of the Caller.

6. The method according to claim 5, wherein the association between the placed call to the Destination and the number of the Caller is persistently stored.

7. The method according to claim 6, wherein the step of connecting the Caller to the Agent comprises the steps of:
determining the number of the returning Caller;
retrieving the association between the number of the returning Caller and the placed call to the Destination; and,
connecting the second call with the associated call to the Destination.

8. The method according to claim 1, wherein the step of notifying the Caller comprises sending a Short Message Service (SMS) message to the Caller.

9. The method according to claim 1, wherein the step of notifying the Caller comprises causing a phone of the Caller to ring for a short time.

10. The method according to claim 1, wherein the step of notifying the Caller comprises calling the Caller and playing a short message on answer.

11. The method according to claim 1, wherein the step of notifying the Caller comprises sending a message to an App on a smart phone of the Caller.

12. The method according to claim 11, wherein the step of notifying the Caller further comprises automatically initiating a call from the Caller's smart phone to the Service.

13. The method according to claim 1, further comprising the step of:
requesting the caller to enter a number for the Destination.

14. The method according to claim 1, further comprising the steps of:
providing the Caller with an App for a smart-phone;
using, by the Caller, the App to enter or select the number for the Destination;
sending, by the App, the Destination number and the associated Caller's number to the Service;
storing, by the Service, the association of Destination and Caller number persistently as an impending request;
originating, by the App, a call from the Caller's smart phone to the service;

using, by the Service, the stored impending request to determine the number of the Destination; and, placing a call from the Service to the Destination.

15. The method according to claim 1, wherein the step of placing the call from the Service to the Destination comprises the steps of:
   placing the call to the Destination such that the Caller can hear the call on a telephone;
   allowing the Caller to make menu choices using the telephone;
   allowing the Caller to disconnect the telephone from the call by using at least one of a smart phone App and a predefined key sequence; and,
   leaving the placed call to the Destination in place after the Caller has disconnected.

16. The method according to claim 1, wherein the step of placing the call from the Service to the Destination comprises:
   disconnecting the Caller from the Service once a Destination number has been obtained; and,
   placing the call from the Service to the Destination at a later time.

17. The method according to claim 16, wherein the rate of calls placed from the Service to the Destination is controlled or throttled.

18. The method according to claim 1, wherein the step of determining that an Agent at the Destination has answered the placed call comprises determining that the call placed to the Destination is no longer ringing.

19. The method according to claim 1, wherein the step of determining that an Agent at the Destination has answered the placed call comprises receiving, at the Service, an indication entered by the Agent using a numeric keypad of the Agent's phone.

20. The method according to claim 1, wherein the first call from the Caller is placed directly from a phone of the Caller.

21. The method according to claim 1, wherein the first call to the Service from the Caller has been forwarded from another source.

22. The method according to claim 1, wherein a Destination number is determined from a manual entry by the Caller using a keypad on a phone.

23. The method according to claim 1, wherein a Destination number is determined by an App on a smart phone of the Caller.

24. The method according to claim 1, wherein a Destination number is determined from a CallerID of the incoming call.

25. The method according to claim 1, wherein the Caller is disconnected from the first call by the Caller while the placed call to the Destination is maintained.

26. The method according to claim 1, wherein the Service is distinct from the Destination.

27. A non-transitory computer readable medium having stored therein instructions that, upon execution, cause a computer to perform a method, the method comprising:
   receiving at a Service a first call from a Caller to a Destination;
   placing a call from the Service to the Destination;
   maintaining the placed call to the Destination while disconnecting the Caller from the first call;
   subsequently, after disconnecting the Caller from the first call, determining that an Agent at the Destination has answered the placed call to the Destination;
   notifying the Caller that an Agent has answered the placed call to the Destination, wherein the notification does not connect the Caller with the Agent;
   subsequently, after notifying the Caller that the Agent has answered the placed call to the Destination, receiving at the Service a second call from the Caller; and,
   connecting the Caller to the Agent by connecting the second call to the placed call to the Destination.

28. The non-transitory computer readable medium according to claim 27, wherein the Caller is disconnected from the first call by the Caller while the placed call to the Destination is maintained.

* * * * *